United States Patent
Sasano et al.

(10) Patent No.: US 7,364,796 B2
(45) Date of Patent: Apr. 29, 2008

(54) ADHESIVE COMPOSITION AND FLEXIBLE PACKAGING COMPOSITE FILM

(75) Inventors: Shigetoshi Sasano, Osaka (JP); Sachio Igarashi, Osaka (JP)

(73) Assignee: Mitsui Takeda Chemicals, Inc., Tokyo (JP)

( * ) Notice: Subject to any disclaimer, the term of this patent is extended or adjusted under 35 U.S.C. 154(b) by 456 days.

(21) Appl. No.: 10/522,016

(22) PCT Filed: Jul. 22, 2003

(86) PCT No.: PCT/JP03/09243

§ 371 (c)(1),
(2), (4) Date: Jan. 21, 2005

(87) PCT Pub. No.: WO2004/011570

PCT Pub. Date: Feb. 5, 2004

(65) Prior Publication Data

US 2005/0272898 A1    Dec. 8, 2005

(30) Foreign Application Priority Data

Jul. 26, 2002    (JP) .............................. 2002-217438

(51) Int. Cl.
  *B32B 27/40* (2006.01)
  *C09J 175/06* (2006.01)
  *C09J 177/06* (2006.01)

(52) U.S. Cl. ............... 428/423.1; 156/331.4; 528/65; 524/710

(58) Field of Classification Search ............. 428/423.1; 528/28, 49, 65; 524/710; 156/331.4
See application file for complete search history.

(56) References Cited

U.S. PATENT DOCUMENTS 4,507,447 A * 3/1985 Yamazaki et al. .......... 525/528

6,288,201 B1    9/2001 Sasano et al.
6,846,894 B2 * 1/2005 Terada et al. .................. 528/28

FOREIGN PATENT DOCUMENTS

| EP | 349838 A1 | 6/1989 |
|---|---|---|
| EP | 0911149 A2 | 4/1999 |
| EP | 1074897 A2 | 2/2001 |
| JP | 9-316422 A | 12/1997 |
| JP | 2001-107016 A | 4/2001 |
| JP | 2001-107017 A | 4/2001 |
| JP | 2001-234150 A | 8/2001 |
| JP | 2002-3601 A | 1/2002 |
| JP | 2002-12844 A | 1/2002 |
| JP | 2002-155260 A | 5/2002 |
| WO | WO 02/092662 A1 | 11/2002 |

* cited by examiner

*Primary Examiner*—Thao Tran
(74) *Attorney, Agent, or Firm*—Buchanan Ingersoll & Rooney PC

(57) ABSTRACT

Adhesive composition and a flexible packaging composite film that can produce a reduced amount of low-molecular-weight compounds eluted into contents of a composite film to prevent spoilage of inherent properties or performances of the contents, can produce improved oil resistance to prevent significant reduction in strength even when used for oily contents, and can develop favorable flexibility of the composite film to prevent reduction in peel strength. Polyester polyamide polyol and/or polyurethane polyester polyamide polyol including an amide bond produced by reaction between a dimer acid and polyamine is prepared as a polyol component and also concentration of a cyclic compound formed by the amide bond and/or an ester bond in extracted water which is extracted from a composite film adhesively bonded by the adhesive composition by water of 0.5 mL/cm$^2$ per unit area of the composite film is set to be 0.5 ppb or less in terms of dibutyl phthalate concentration measured with a gas chromatograph-flame ionization detector.

8 Claims, No Drawings

ADHESIVE COMPOSITION AND FLEXIBLE PACKAGING COMPOSITE FILM

TECHNICAL FIELD

The present invention relates to adhesive composition or more particularly to adhesive composition suitably used for producing a flexible packaging composite film used for packaging materials, such as food products, beverages, medical products, and quasi-drugs, or electronic components such as a hard disc, and to a flexible packaging composite film adhesively bonded by the same adhesive composition.

BACKGROUND ART

At present, composite films, which are produced by laminating films, such as a plastic film, a metal foil such as an aluminum foil, a metal deposited film, and a silica deposited film, by use of adhesive, are being widely used as flexible packaging material used for packaging materials in various industrial fields, including food products, beverages, medical products, and quasi-drugs, or electronic components including, for example, a hard disc.

Two-part reaction ester urethane adhesives which are used by combination of polyisocyanate and polyester polyol are being used most as the adhesive used for producing these composite films, because of their excellent adhesion properties.

In recent years, the studies on the material that may be eluted from the composite film into its contents have been advanced, indicating the possibility that a low-molecular-weight compound may be eluted from the adhesive into the contents to cause partial spoilage of inherent properties or performances of the contents, such as an odor and a taste of the food or the beverage, or the inherent performances of the electronic components, though the cause and effect relationship has not yet been clarified.

For example JP Laid-open (Unexamined) Patent Publications No. 2001-107016 and No. 2001-107017 proposed a laminate adhesive comprising polyester polyurethane polyol, wherein concentration of a cyclic ester compound or a cyclic urethane compound in extracted water, which is extracted from the composite film bonded by the laminate adhesive by using water of 0.5 mL/cm$^2$ per unit area of the composite film is 0.5 ppb or less in terms of dibutyl phthalate concentration measured with a gas chromatograph-flame ionization detector so that the low-molecular-weight compound that may be eluted into the contents of the composite film can be reduced to prevent the inherent properties or performances of the contents from being spoiled.

The laminate adhesive proposed by JP Laid-open (Unexamined) Patent Publications No. 2001-107016 and No. 2001-107017 includes a dimer acid as composition of polyester polyol and, accordingly, it provides good water resistance, but disadvantageously decreases in oil resistance. It also decreases in concentration of an ester group and thus decreases in cohesion. Due to this, when this laminate adhesive is applied to the composite film for packing an oily food product, such as a retort food, requiring heat sterilization treatment, it disadvantageously reduces in strength of the composite film significantly after heat-sterilized.

It may be conceivable that for example an amide bond is introduced in polyester polyol to improve the cohesion. However, when the amide bond derived from aromatic or aliphatic bibasic acid used as a common ester material is introduced therein, flexibility of the adhesive required for the production of the flexible packaging composite film is spoiled and peel strength of the same is reduced disadvantageously.

DISCLOSURE OF THE INVENTION

It is the object of the present invention to provide adhesive composition that can produce a reduced amount of low-molecular-weight compounds eluted into contents of a composite film to prevent spoilage of inherent properties or performances of the contents, can produce improved oil resistance to prevent significant reduction of strength even when used for oily contents, and can develop favorable flexibility of the composite film to prevent reduction of peel strength, and a flexible packaging composite film adhesively bonded by using the same adhesive composition.

The present invention provides adhesive composition comprising a polyisocyanate component and a polyol component, wherein the polyol component includes polyester polyamide polyol and/or polyurethane polyester polyamide polyol including an amide bond produced by reaction between a dimer acid and polyamine, and wherein concentration of a cyclic compound containing the amide bond and/or an ester bond in extracted water which is extracted from a composite film adhesively bonded by the adhesive composition by water of 0.5 mL/cm$^2$ per unit area of the composite film is 0.5 ppb or less in terms of dibutylphthalate concentration measured with a gas chromatograph-flame ionization detector.

In the present invention, it is preferable that the polyester polyamide polyol and/or the polyurethane polyester polyamide polyol includes the ester bond produced by reaction between a polybasic acid and/or alkylester thereof and polyol and that the polybasic acid is an aromatic dibasic acid and/or the dimer acid.

In the present invention, it is preferable that 10-90 mol % of a carboxyl group of the dimer acid forming the amide bond reacts with an amino group of the polyamine.

In the present invention, it is preferable that the adhesive composition further comprises a silane coupling agent.

The adhesive composition of the present invention can be suitably used for production of a flexible packaging composite film.

Also, the present invention covers a flexible packaging composite film adhesively bonded by the above-said adhesive composition.

According to the adhesive composition of the present invention, elution of a cyclic compound from a composite film adhesively bonded by the adhesive composition into the contents of the composite film which is caused by the adhesive composition is extremely reduced, as compared with conventional ester urethane adhesive. Hence, when a food product or beverage is packed in the composite film, the inherent properties, such as the odor and taste, of the food product or beverage can be prevented from being spoiled. Also, when an electronic component, such as a hard disc, which is subjected to loss by contaminating with even an extremely small amount of foreign objects, is packed in the film, the inherent performances of the electronic component can be prevented from being spoiled. Accordingly, the adhesive composition of the present invention can be suitably used as the adhesive for use in producing the flexible packaging composite films used for a variety of industrial products including those products.

Also, the adhesive composition of the present invention can provide good oil resistance. Hence, even when the adhesive composition of the present invention is used for the composite film for packaging an oily food product, such as a retort food, requiring heat sterilization treatment, it can prevent significant reduction of the strength of the composite film after heat-sterilized and can keep its adhesive strength in the good condition.

Besides, since the adhesive composition of the present invention can well develop flexibility of the adhesive required for the production of the flexible packaging composite film, it can prevent reduction of the peeling strength of the composite film.

Hence, the flexible packaging composite film of the present invention adhesively bonded by the adhesive composition of the present invention can be effectively used as the composite film for using a flexible packaging material that can prevent spoilage of the inherent properties or performances of the packed contents, can minimize significant reduction of the strength after heat-sterilized, and can minimize reduction of the peeling strength.

BEST MODE FOR CARRYING OUT THE INVENTION

An adhesive composition of the present invention comprises a polyisocyanate component and a polyol component.

In the present invention, polyisocyanate commonly used for the production of polyurethane is used as the polyisocyanate component of the present invention. For example, polyisocyanate monomers, derivatives thereof, etc. may be used as the polyisocyanate component of the present invention.

The polyisocyanate monomers which may be used include, for example, aliphatic diisocyanate such as hexamethylene diisocyanate, alicyclic diisocyanate such as 3-isocyanatomethyl-3,5,5-trimethylcyclohexyl isocyanate, dicyclohexylmethane-4,4'-diisocyanate, 1,3- or 1,4-bis (isocyanatomethyl) cyclohexane or mixtures thereof, aromatic aliphatic diisocyanate such as 1,3- or 1,4-xylylene diisocyanate or mixtures thereof, 1,3- or 1,4-bis(1-isocyanato-1-methyl ethyl)benzene or mixtures thereof, and aromatic diisocyanate such as 2,4- or 2,6-trilenediisocyanate or mixtures thereof, and diphenylmethane diisocyanate.

The derivatives of the polyisocyanate monomers which may be used include, for example, polymers of polyisocyanate, such as dimers or trimers of polyisocyanate monomers, modified polyisocyanates, such as modified biurets, modified allophanates, and modified oxadiazinetrions obtained by reaction of the polyisocyanate monomers with water, polyol, and carbon dioxide gas, and polyol adducts and/or polyamine adducts obtained by reaction of the polyisocyanate monomers with polyol and/or polyamine as mentioned later.

These polyisocyanate components may be used singly or in combination of two or more. Preferably, the derivatives of polyisocyanate monomers are used. Specifically, those having an unreacted monomer content of 1% or less are preferably used.

In the present invention, the polyol components include polyester polyamide polyol including an amide bond obtained by the reaction between a dimer acid and polyamine, and/or polyurethane polyester polyamide polyol including an amide bond obtained by the reaction between a dimer acid and polyamine The polyester polyamide polyols include a polyester unit and a polyamide unit.

The polyester unit is a unit including an ester bond, which is formed by the reaction between polybasic acid and/or alkylester thereof, and polyol.

No particular limitation is imposed on the polybasic acid and/or alkylester thereof. For example, phthalic acid (e.g. orthophthalic acid, isophthalic acid, and terephthalic acid) and/or alkylester thereof, naphthalenedicarboxylic acid (e.g. 2,6-naphthalenedicarboxylic acid) and/or alkylester thereof, and dimer acid are preferably used.

The use of aromatic dibasic acids including, for example, phthalic acid and/or alkylester thereof, and naphthalenedicarboxylic acid and/or alkylester thereof can provide improved heat resistance.

These polybasic acids and/or the alkylesters thereof may be used singly or in combination of two or more.

Alkyl ester of polybasic acid having 1-4 carbons, or preferably, methyl ester of polybasic acid or ethyl ester of polybasic acid, is used as the alkyl ester of polybasic acid.

The dimer acid can be used without any particular limitation, as long as it is available as an industrial raw material. For example, the dimer acids that may be used include the one comprising a dimer unsaturated fatty acid having 18 carbons as its major component, the one further comprising a monomer acid and a trimer acid, and furthermore hydrogenating materials thereof.

The polyols that may preferably be used include glycols, such as ethylene glycol, diethylene glycol, propylene glycol, 1,3-butanediol, 1,4-butanediol, 2-methyl-1,3-propanediol, neopentyl glycol, 1,6-hexandiol, 1,7-heptanediol, 1,9-nonanediol, cyclohexanedimethanol, 3-methyl-1,5-pentanediol, 3,3'-dimethylolheptane, and 2-methyl-1,8-octanediol, triols, such as glycerine and trimethylolpropane, and dimethylol alkanoic acids, such as dimethylol propionic acid and dimethylol butanoic acid. These polyols may be used singly or in combination of two or more.

In the polyester unit formed by the reaction between the polybasic acid and/or alkyl ester thereof and the polyol, glycol including no ether linkage in the principal chain and having 6-7 carbons in the principal chain, or preferably 1,6-hexandiol, is used together with phthalic acid and/or alkyl ester thereof, or preferably isophthalic acid and/or alkylester thereof. This can make it hard for the cyclic ester compound having two molecules of the isophthalic acid and two molecules of the 1,6-hexandiol, which is produced by the reaction between the isophthalic acid and the 1,6-hexandiol, to elute through the film, so that the inherent properties or performances of the packaged contents are maintained in good condition. It is to be noted that the principal chain of glycol means a molecular chain sandwiched between two hydroxyl groups, and the carbon number of the principal chain indicates the number of carbons residing in the molecular chain.

For example, when the isophthalic acid and/or alkyl ester thereof is/are allowed to react with the glycol having the carbon number of the principal chain of 5 or less, there is a possibility that a cyclic ester compound having two molecules of the isophthalic acid and two molecules of the glycol may be produced and the cyclic ester compound produced may be eluted through the film. When the isophthalic acid and/or alkyl ester thereof is/are allowed to react with the glycol having the carbon number of the principal chain of 8 or more, there is a possibility that a cyclic ester compound having one molecule of the isophthalic acid and one molecule of the glycol may be produced and the cyclic ester compound produced may be eluted through the film.

Also, when naphthalene dicarboxylic acid and/or alkyl ester thereof are used, a cyclic ester compound from naphthalene dicarboxylic acid and glycol, which is produced by the reaction between naphthalene dicarboxylic acid and glycol, is prevented from being eluted through the film, so that the inherent properties or performances of the packaged contents are maintained in good condition.

Also, when the dimer acid is used, a cyclic ester compound from dimer acid and glycol, which is produced by the reaction between dimer acid and glycol, is prevented from being eluted through the film, so that the inherent properties or performances of the packaged contents are maintained in good condition.

In the present invention, it is preferable that the polyester unit in polyester polyamide polyol includes the ester bond formed by the reaction between phthalic acid and/or alkyl ester thereof and glycol including no ether linkage in the principal chain and having 6-7 carbons in the principal chain, the ester bond formed by the reaction between naphthalene dicarboxylic acid and/or alkyl ester thereof and glycol, and the ester bond formed by the reaction between dimer acid and glycol as the principal ester bond.

The polyamide unit is a unit including an amide bond. In the present invention, the polyamide unit includes the amide bond formed by the reaction between dimer acid and polyamine as an essential component and is formed by the reaction between polybasic acid and polyamine.

Inclusion of this polyamide unit in the polyol components can produce improved cohesion of the adhesive composition and thus can prevent significant reduction of the strength of the composite film after heat-sterilized.

The same polybasic acids as those mentioned above may be used as the polybasic acid, and the dimer acid is used as the essential component.

No particular limitation is imposed on the polyamine used. The polyamines that may be used include, for example, aliphatic diamines, such as ethylene diamine, propylene diamine, and hexamethylene diamine, alicyclic diamines, such as isophorone diamine, dicyclohexylmethane-4,4'-diamine, and 1,3- or 1,4-bis-(aminomethyl) cyclohexane or mixture thereof, aromatic aliphatic diamines, such as 1,3- or 1,4-xylylenediamine or mixture thereof, and 1,3- or 1,4-bis-(1-amino-1-methylethyl)benzene or mixture thereof, aromatic diamines, such as 2,4-or 2,6-tolylenediamine or mixture thereof, and diphenylmethane diamine, and polyfunctional polyamines having at least three amino groups, such as diethylene triamine, triethylene tetramine, tetraethylene pentamine, pentaethylene hexane, and 2,2'-diaminodiethylamine. Practically, polyamines with boiling points of 180° C. or more are used. These polyamines may be used singly or in combination of two or more. Aliphatic diamines and alicyclic diamines are preferably used.

When the dimer acid is used in the polyamide unit formed by the reaction between the polybasic acid and the polyamine, the cyclic amide compound from dimer acid and diamine, which is produced by the reaction between dimer acid and diamine, is prevented from being eluted through the film, so that the inherent properties or performances of the packaged contents are maintained in good condition. In addition, the composite film can be made to develop good flexibility to prevent reduction in peel strength.

Accordingly, in the present invention, it is preferable that the polyamide unit in the polyester polyamide polyol includes the amide bond formed by the reaction between dimer acid and aliphatic diamine and/or the amide bond formed by the reaction between dimer acid and alicyclic diamine as the principal amide bond.

It is preferable that 10-90 mol % of a carboxyl group of the dimer acid reacts with an amino group of the polyamine.

In the present invention, the polyester polyamide polyol can be synthesized by a known method without any particular limitation, as long as it includes the polyester unit mentioned above and the polyamide unit mentioned above.

For example, this polyester polyamide polyol can be produced by allowing polybasic acid and/or alkylester thereof, polyol, and polyamine to react with each other at 160-250° C. in an inert gas atmosphere.

In this process, the polybasic acid (except the dimer acid) and/or alkylester thereof, polyol, and polyamine are allowed to react with each other, first. If necessary, water or alcohol produced is distilled off. Thereafter, the dimer acid is added to a reaction system including the polybasic acid (except the dimer acid) and/or alkylester thereof, the polyol, and the polyamine and further is allowed to react therewith at 160-250° C. in the inert gas atmosphere to produce the polyester polyamide polyol.

The polyester polyamide polyol can also be produced by other methods. For example, the polybasic acid (except the dimer acid) and/or alkylester thereof, and polyol are allowed to react with each other at 160-250° C. in the inert gas atmosphere to synthesize polyester polyol, first. If necessary, water or alcohol produced is distilled off. Thereafter, the dimer acid and the polyamine are added to the polyester polyol synthesized (or in process of synthesization) and further is allowed to react therewith at 160-250° C. in the inert gas atmosphere to produce the polyester polyamide polyol.

Alternatively, the dimer acid and the polyamine are allowed to react with each other at 160-250° C. in the inert gas atmosphere to synthesize a polyamide polycarboxylic acid having a carboxyl group at the molecular terminal, first. Also, the polybasic acid and the polyol are allowed to react with each other at 160-250° C. in the inert gas atmosphere to synthesize polyester polyol having a hydroxyl group at the molecular terminal, separately. If necessary, water or alcohol produced is distilled off. Thereafter, the polyamide polycarboxylic acid synthesized (or in process of synthesization) is blended in the polyester polyol synthesized (or in process of synthesization) and further is allowed to react therewith at 160-250° C. in the inert gas atmosphere to produce the polyester polyamide polyol.

In any of the methods described above, the polybasic acid and/or alkylester thereof, polyol, and polyamine can be mixed in a selective proportion such that the polyester polyamide polyol finally obtained can substantially have a hydroxyl group at the molecular terminal.

Further, in the present invention, the hydroxyl group at the molecular terminal of the polyester polyamide polyol thus obtained can be allowed to react with polybasic anhydride, to subject the molecular terminal to the acid modification reaction. The acid modification reaction can be carried out by a known method using polybasic anhydride, such as trimellitic acid anhydride, pyromellitic anhydride, phthalic anhydride, and maleic anhydride.

In the present invention, as long as the polyester polyamide polyol thus obtained is included as raw material, the polyester polyamide polyol may be used as it is or may be used as polyurethane polyester polyamide polyol by subjecting the polyester polyamide polyol to the chain extension reaction with polyisocyanate. Further, it may be used as a high-molecular-weight polyester polyamide polyol by subjecting the polyester polyamine polyol to the condensation reaction. When the polyester polyamide polyol is subjected to the chain extension reaction or the condensation reaction so that it can be polymerized, the adhesive composition obtained can develop desired properties. When the polyester polyamide polyol is used as the polyol component as it is, it has preferably the number average molecular weight of e.g. 500 to less than 3,000.

When the polyester polyamide polyol is subjected to the chain extension reaction with the polyisocyanate, the polyester polyamide polyol, and the polyisocyanate may be subjected to the urethane reaction by a known method at an equivalent ratio (NCO/OH) of an isocyanate group of the polyisocyanate to a hydroxyl group of the polyester polyamide polyol of less than 1, or preferably in the range of 0.5-0.95. No particular limitation is imposed on the chain extension reaction. The chain extension reaction may be produced using the polyisocyanate recited above, or preferably aliphatic diisocyanate and alicyclic diisocyanate.

The polyurethane polyester polyamide polyol thus produced has preferably the number average molecular weight of about 1,000 to about 100,000, or further preferably about 5,000 to about 20,000.

In this chain extension reaction, the polyol mentioned above as well as the polyester polyamide polyol mentioned above may be reacted with the polyisocyanate. In this reaction as well, it is preferable that they are allowed to react with each other at an equivalent ratio (NCO/OH) of an isocyanate group of the polyisocyanate to a hydroxyl group of the polyester polyol and polyol of less than 1, or preferably in the range of 0.5-0.95.

When the polyester polyamide polyol is subjected to the chain extension reaction, it is preferable that unreacted glycol in the polyester polyamide polyol is not more than 0.1 weight %. When the unreacted glycol in the polyester polyamide polyol is in excess of 0.1 weight %, there is the possibility that when the polyester polyamide polyol and polyisocyanate are allowed to react with each other, they may react with the unreacted glycol to thereby produce a cyclic urethane compound, depending on the kinds of polyisocyanate, and the cyclic urethane compound may be eluted through the film. The content of the unreacted glycol in the polyester polyamide polyol can be measured by gas chromatography (flame ionization detector), for example. A known process of removing the unreacted glycol, such as, for example, removing the unreacted glycol in reduced pressure, may be used to adjust the unreacted glycol in the polyester polyamide polyol to be 0.1 weight % or less.

When the polyester polyamide polyol is subjected to the condensation reaction, the polyester polyamide polyol produced by the method mentioned above may be condensed, for example, at 160-250° C. under reduced pressure.

The high-molecular-weight polyester polyamide polyol thus produced has preferably the number average molecular weight of about 3,000 to about 100,000, or further preferably about 5,000 to about 20,000.

The adhesive composition of the present invention can be obtained by mixing the polyisocyanate component mentioned above with the polyol component including polyester polyamide polyol (including polyurethane polyester polyamide polyol including polyester polyamide polyol as raw material, and/or high-molecular-weight polyester polyamide polyol).

Preferably, the mixing ratio of polyisocyanate component with the polyol component is in the range of between not less than 0.4 and not more than 10.0, or preferably between not less than 0.5 and not more than 5.0, in the equivalent ratio (NCO/OH) of an isocyanate group of the polyisocyanate component to a hydroxyl group of the polyol component.

Further, the adhesive composition of the present invention may be mixed with a silane coupling agent.

The silane coupling agents that may be used include any compounds having structural formula of R—SiX$_3$ or R—Si(R')X$_2$ (wherein R represents an organic group having a vinyl group, an epoxy group, an amino group, an imino group, an isocyanate group or a mercapto group; R' represents a lower alkyl group; and X represents a methoxy group or an ethoxy group, or a chlorine atom). For example, chlorosilanes, such as vinyltrichlorosilane, aminosilanes, such as N-β-(aminoethyl)-γ-aminopropyltrimethoxysilane, γ-aminopropyltriethoxysilane, N-β-(aminoethyl)-γ-propylmethyl dimethoxysilane, n-(dimethoxymethylsilylpropyl) ethylenediamine, n-(triethoxysilylpropyl)ethylenediamine, and N-phenyl-γ-aminopropyltrimethoxysilane, epoxysilanes, such as γ-glycidoxypropyltrimethoxysilane, γ-glycidoxypropyltriethoxysilane, β-(3,4-epoxycyclohexyl)ethyltrimethoxy silane, and di(γ-glycidoxypropyl) dimethoxysilane, vinyl silanes, such as vinyltriethoxysilane, and isocyanate silanes, such as 3-isocyanatepropyltrimethoxysilane, and 3-isocyanatepropyltriethoxysilane can be cited as the silane coupling agent. These silane coupling agents may be used singly or in combination of two or more.

Further, an additive for use in providing adhesion properties, such as a phosphorous oxygen acid or derivative thereof, and a known catalyst for adjusting the curing reaction may be mixed in the adhesive composition of the present invention within the range that the performance of the adhesive composition of the present invention is not inhibited.

The adhesive composition of the present invention thus produced can mainly be used as a binder and an adhesive for use in adhesive bonding. Particularly, the adhesive composition of the present invention can be preferably used as a laminate adhesive for use in producing a composite film for using a flexible packaging material by lamination.

The composite film can be produced, for example, by the following lamination processes. That is to say, a polyisocyanate component and a polyol component are diluted with organic solvent, such as ethyl acetate, and then mixed for preparation of the adhesive composition of the present invention. Thereafter, the adhesive composition thus prepared is coated over surfaces of the respective films by use of a solvent type laminator. After the solvent is vaporized, the adhering surfaces of the respective films are bonded together and then cured under room temperature or warmed temperature for the curing. Or, in the case where the mixing viscosity of a polyisocyanate component and a polyol component is about 100 to about 10,000 mPa·s, or preferably about 100 to about 5,000 mPa·s, in the temperature range between room temperature and 100° C., for example the polyisocyanate component and the polyol component are mixed as they are, for preparation of the adhesive composition of the present invention. Then, the adhesive composition thus prepared is coated over the surfaces of the respective films by use of a solvent-free type laminator to bond the adhering surfaces of the films together. Thereafter, the adhering surfaces are cured under room temperature or warmed temperature for the curing of the adhesive composition. It is preferable that the spread of the adhesive composition of the solvent type is usually in the range of about 2.0 to about 5.0 g/m$^2$ after vaporization of the solvent, and the spread of the adhesive composition of the solvent-free type is usually in the range of about 1.0 to about 3.0 g/m$^2$.

Examples of the films to be laminated include plastic films of e.g. polyethylene terephthalate, nylon, polyethylene, polypropylene, and polyvinyl chloride, metal foils of e.g. aluminum, metal deposited films, silica deposited films, and metallic films of e.g. stainless steel, iron, copper, and lead. Take the plastic films for instance, they preferably have thickness of 5-200 µm.

The adhesive composition of the present invention is formed so that concentration of a cyclic compound, formed by the amide bond and/or the ester bond, in extracted water which is extracted from the thus laminated composite film by water of 0.5 mL/cm$^2$ per unit area of the composite film, (i.e., at least any of a cyclic amide compound, a cyclic ester compound, and a cyclic amide-ester compound) is 0.5 ppb or less in terms of dibutyl phthalate concentration measured with the gas chromatograph-flame ionization detector. With the 0.5 ppb or less concentration, the elution of the cyclic compound into the contents of the composite film which is caused by the adhesive composition is extremely reduced, as compared with the conventional ester urethane adhesive.

The concentration of the cyclic compound formed by the amide bond and/or the ester bond can be measured by the following method, for example. A bag is made from the composite film produced by lamination of films in the manner described above, and then ion-exchange distilled water is filled in the bag as the contents by the amount of 0.5 mL/cm$^2$ per unit area of the composite film. After the bag is sterilized by heated water under pressure, the contained water is extracted by a known method, such as a liquid-solid extraction or a liquid-liquid extraction, for recovering substantially all cyclic compounds formed by the amide bond and/or the ester bond. Then, samples are drawn from the extracts and are measured by the gas chromatography (flame ionization detector).

The quantity can be measured as a value to be converted to dibutyl phthalate concentration with the flame ionization detector of the gas chromatograph, using dibutyl phthalate as reference material. For example, if the concentration of the cyclic compound formed by the amide bond and/or the ester bond of 0.5 ppb or less in terms of dibutyl phthalate concentration can be measured by detecting the presence of the cyclic compound formed by the amide bond and/or the ester bond, then the detection limit of the concentration of the cyclic compound formed by the amide bond and/or the ester bond in the extracted water can be supposed to be 0.5 ppb in terms of dibutyl phthalate concentration.

According to the adhesive composition of the present invention, since the concentration of the cyclic compound formed by the amide bond and/or the ester bond thus measured is 0.5 ppb or less, the elution of the cyclic compound into the contents of the composite film which is caused by the adhesive composition is extremely reduced, as compared with the conventional ester urethane adhesive. Hence, when a food product or beverage is packed in the composite film, the inherent properties, such as the odor and taste, of the food product or beverage can be prevented from being spoiled. Also, when an electronic component, such as a hard disc, which is subjected to loss by contaminating with even an extremely small amount of foreign objects, is packed in the film, the inherent performances of the electronic component can be prevented from being spoiled. Thus, the adhesive composition of the present invention can be suitably used as the adhesive for use in producing the flexible packaging composite films used for a variety of industrial products including those products.

Also, due to the dimer acid contained in the polyester polyamide polyol, the adhesive composition of the present invention provides good water resistance, while on the other hand, it provides reduced oil resistance and reduced concentration of the ester group. However, due to the amide group contained therein, the adhesive composition of the present invention can provide improved cohesion, and as such can allow improved oil resistance. Hence, even when the adhesive composition of the present invention is used for the composite film for packaging an oily food product, such as a retort food, requiring the heat sterilization treatment, it can prevent significant reduction of the strength of the composite film after heat-sterilized and can keep its adhesive strength in the good condition.

Besides, since the adhesive composition of the present invention can well develop the flexibility of the adhesive required for the production of the flexible packaging composite film, it can prevent reduction of the peeling strength of the composite film.

Hence, the flexible packaging composite film of the present invention adhesively bonded by the adhesive composition of the present invention can be effectively used as the composite film for using a flexible packaging material that can prevent spoilage of the inherent properties or performances of the packed contents, can minimize significant reduction of the strength after heat-sterilized, and can minimize reduction of the peeling strength.

EXAMPLES

While the present invention will be described in further detail with reference to the following examples and comparative examples, the present invention is not limited thereto. It should be noted that the terms, "parts" and "%", presented in the examples and the comparative examples are all on a weight basis, unless otherwise specified therein.

Production Example 1

Production of Polyester Polyamide Polyol A 316.9 g of dimer acid and 29.5 g of isophoronediamine (equivalent to 30 mol % of carboxylic acid group) were added and then subjected to amidization reaction at 180-220° C. in a stream of nitrogen to thereby produce polyamidecarboxylic acid A. The acid value of the polyamide-polycarboxylic acid A produced was 125.5 mgKOH/g.

Then, 367.9 g of isophthalic acid, 404.9 g of 1,6-hexanediol, and 0.1 g of zinc acetate were added and then subjected to esterification reaction at 180-220° C. in a stream of nitrogen, separately. After a prescribed amount of water was distilled, 340.2 g of polyamide polycarboxylic acid A synthesized separately was added thereto and then subjected to esterification reaction at 180-220° C. in a stream of nitrogen until the acid value of the same reduces to 1 or less to thereby produce polyester polyamide polyol A. The acid value of the polyester polyamide polyol A produced was 0.4 mgKOH/g and the hydroxyl value of the same was 75.7 mgKOH/g.

Production Example 2

Production of Polyester Polyamide Polyol B 367.9 g of isophthalic acid, 404.9 g of 1,6-hexanediol, and 0.1 g of zinc acetate were added and then subjected to esterification reaction at 180-220° C. in a stream of nitrogen. After a prescribed amount of water was distilled, 316.9 g of dimer acid, and 29.5 g of isophoronediamine were added thereto and then subjected to amidization reaction and esterification reaction 25 at 180-220° C. in a stream of nitrogen until the acid value of the same reduces to 1 or less to thereby produce polyester polyamide polyol B. The acid value of the polyester polyamide polyol B produced was 0.7 mgKOH/g and the hydroxyl value of the same was 75.4 mgKOH/g.

Production Example 3

Production of Polyester Polyamide Polyol C 367.9 g of isophthalic acid, 404.9 g of 1,6-hexanediol, 29.5 g of isophoronediamine, and 0.1 g of zinc acetate were added and then subjected to esterification reaction and amidization reaction at 180-220° C. in a stream of nitrogen. After a prescribed amount of water was distilled, 316.9 g of dimer acid was added thereto and then subjected to amidization reaction and esterification reaction at 180-220° C. in a stream of nitrogen until the acid value of the same reduces to 1 or less to thereby produce polyester polyamide polyol C. The acid value of the polyester polyamide polyol C produced was 0.9 mgKOH/g and the hydroxyl value of the same was 75.0 mgKOH/g.

Production Example 4

Production of Polyester Polyol A 371.5 g of isophthalic acid, 413.2 g of 1,6-hexanediol, and 0.1 g of zinc acetate were added and then subjected to esterification reaction at 180-220° C. in a stream of nitrogen. After a prescribed amount of water was distilled, 320.0 g of dimer acid was added thereto and then subjected to esterification reaction at 180-220° C. in a stream of nitrogen until the acid value of the same reduces to or less to thereby produce polyester polyol A. The acid value of the polyester polyol A produced was 0.5 mgKOH/g and the hydroxyl value of the same was 75.6 mgKOH/g.

Production Example 5

Production of Polyol Component A 400 g of polyester polyamide polyol A and 71.1 g of isophoronediisocyanate were added and then subjected to chain extension reaction at 100-110° C. in an atmosphere of nitrogen to thereby produce polyurethane polyester polyamide polyol A. After the reaction, ethyl acetate was added thereto to thereby produce a polyol component A in solution of a solid content of 50%.

Production Example 6

Production of Polyol Component B 400 g of polyester polyamide polyol B and 71.1 g of isophoronediisocyanate were added and then subjected to chain extension reaction at 100-110° C. in an atmosphere of nitrogen to thereby produce polyurethane polyester polyamide polyol B. After the reaction, ethyl acetate was added thereto to thereby produce a polyol component B in solution of a solid content of 50%.

Production Example 7

Production of Polyol Component C 400 g of polyester polyamide polyol C and 71.1 g of isophoronediisocyanate were added and then subjected to chain extension reaction at 100-110° C. in an atmosphere of nitrogen to thereby produce polyurethane polyester polyamide polyol C. After the reaction, ethyl acetate was added thereto to thereby produce a polyol component C in solution of a solid content of 50%.

Production Example 8

Production of Polyol Component D 400 g of polyester polyol A and 71.1 g of isophoronediisocyanate were added and then subjected to chain extension reaction at 100-110° C. in an atmosphere of nitrogen to thereby produce polyurethane polyester polyol A. After the reaction, ethyl acetate was added thereto to thereby produce a polyol component D in solution of a solid content of 50%.

Production Example 9

Production of Polyol Component E 120.3 g of 2,6-naphthalene dicarboxylic acid dimethylester, 29.0 g of ethylene glycol, 48.7 g of neopentyl glycol, 23.7 g of propylene glycol, and 0.01 g of titanium tetrabutoxide were added and then subjected to ester exchange reaction at 180-220° C. in a stream of nitrogen. After a prescribed amount of methanol was distilled, 281.9 g of dimer acid and 51.0 g of isophoronediamine were added thereto and then subjected to amidization reaction and esterification reaction at 180-220° C. until the acid value of the same reduces to 1 or less. After a prescribed amount of water was distilled, the interior of a system was gradually depressurized, so that the resultant reaction product was condensed at 220° C. for 4 hours under pressure of 13.3 Pa or less, to obtain high-molecular-weight of polyester polyamide polyol A. The total amount of the polyester polyamide polyol thus obtained was dissolved in ethyl acetate to produce a polyol component E in solution of a solid content of 50%.

Production Example 10

Production of Polyol Component F 120.3 g of 2,6-naphthalenedicarboxylic acid dimethylester, 29.0 g of ethylene glycol, 48.7 g of neopentyl glycol, 23.7 g of propylene glycol, 51.0 g of isophoronediamine, and 0.01 g of titanium tetrabutoxide were added and then subjected to ester exchange reaction at 180-220° C. in a stream of nitrogen. After a prescribed amount of methanol was distilled, 281.9 g of dimer acid was added there to and then subjected to amidization reaction and esterification reaction at 180-220° C. until the acid value of the same reduces to 1 or less. After a prescribed amount of water was distilled, the interior of a system was gradually depressurized, so that the resultant reaction product was condensed at 220° C. for 4 hours under pressure of 13.3 Pa or less, to obtain high-molecular-weight of polyester polyamide polyol B. The total amount of the polyester polyamide polyol thus obtained was dissolved in ethyl acetate to produce a polyol component F in solution of a solid content of 50%.

Production Example 11

Production of Polyol Component G 128.0 g of 2,6-naphthalene dicarboxylic acid dimethylester, 30.3 g of ethylene glycol, 50.8 g of neopentyl glycol, 49.5 g of propylene glycol, and 0.01 g of titanium tetrabutoxide were added and then subjected to ester exchange reaction at 180-220° C. in a stream of nitrogen. After a prescribed amount of methanol was distilled, 300.0 g of dimer acid was added thereto and then subjected to esterification reaction at 180-220° C. until the acid value of the same reduces to 1 or less. After a prescribed amount of water was distilled, the interior of a system was gradually depressurized, so that the resultant reaction product was condensed at 220° C. for 4 hours under pressure of 13.3 Pa or less, to obtain high-molecular-weight of polyester polyol C. The total amount of the polyester polyol thus obtained was dissolved in ethyl acetate to produce a polyol component G in solution of a solid content of 50%.

Production Example 12

Production of Polyol Component H 400 g of polyester polyamide polyol B, 4.4 g of dimethylol butanoic acid, and 54.6 g of dicyclohexylmethane-4,4'-diisocyanate were added and then subjected to chain extension reaction at 110-120° C. in an atmosphere of nitrogen to thereby produce polyurethane polyester polyamide polyol D. After the reaction, ethyl acetate was added thereto to thereby produce a polyol component H in solution of a solid content of 50%.

Production Example 13

Production of Polyol Component I

After polyester polyamide polyol B was subjected to wiped film evaporation, 71.1 g of isophoronediisocyanate was added to 400 g of polyester polyamide polyol B' with 1,6-hexanediol monomer of 0.1 weight % or less and then subjected to chain extension reaction at 100-110° C. in an atmosphere of nitrogen to thereby produce polyurethane polyester polyamide polyol E. After the reaction, ethyl acetate was added thereto to thereby produce a polyol component I in solution of a solid content of 50%.

Production Example 14

Production of Polyisocyanate Component A 50 g of TAKENATE A-10 (trimethylolpropane adduct of xylylenediisocyanate, available from Mitsui Takeda Chemicals, Inc. and 50 g of TAKENATE A-40 (trimethylolpropane adduct of isophoronediisocyanate available from Mitsui Takeda Chemicals, Inc.) were uniformly mixed at 50° C. in an atmosphere of nitrogen, to obtain polyisocyanate component A.

Preparation of and Evaluation of Examples and Comparative Examples

The polyol components A-I thus obtained, the isocyanate component A and the silane coupling agents (γ-glycidoxypropyltrimethoxysilane available from Shin-Etsu Chemical Co., Ltd.) were mixed as shown in TABLE 1 to prepare the adhesive compositions of Examples 1-9 and the adhesive compositions of Comparative Examples 1 and 2. Subsequently, composite films were produced by the method mentioned later using the adhesive compositions of the respective Examples and Comparative Examples. Thereafter, elusion tests and retorting tests of the respective composite films were conducted. The results are shown in TABLE 2.

Production of Composite Film

Four-layered composite films, each comprising a polyethylene terephthalate film (12 μm thick)/a nylon film (15 μm thick)/an aluminum foil (9 μm thick)/an unextended polypropylene film (70 μm thick: one side of which was corona-treated), were produced by the method mentioned below.

That is to say, the adhesive composition of the respective examples and comparative examples shown in TABLE 1 was coated over one side of the polyethylene terephthalate film with a dry laminator so that weight of the adhesive composition per unit area can become 2.5 g/m² by a sold content, first. Then, after the solvent was vaporized, the coated side of the polyethylene terephthalate film was bonded to the nylon film. Subsequently, the adhesive was coated over the other side of the nylon film of the two-layered composite film in the same manner as the above. After the solvent was vaporized, the coated other side of the nylon film was bonded to one side of the aluminum foil. Subsequently, the adhesive was coated over the other side of the aluminum foil of the three-layered composite film in the same manner as the above. After the solvent was vaporized, the coated other side of the aluminum foil was bonded to corona-treated one side of the unextended polypropylene film. Thereafter, the films thus bonded were cured at 50° C. for three days, for the curing of the adhesive composition.

Elusion Test

A bag was made from each of the composite films thus produced and then ion-exchange distilled water was filled in the bag as the contents by the amount of 0.5 mL/cm² per unit area of the interior surface of the bag. After the bag was sterilized by heated water at 120° C. for 30 minutes under the pressure of $19.6 \times 10^4$ Pa, the contained water was extracted in the solid phase modified with an octadecyl group. Then, samples were drawn from the extracts which were dissolved in methanol of one hundredth of the quantity of original water. The samples were measured by the gas chromatograph (flame ionization detector) and observed on the presence of the cyclic amide compound, cyclic ester compound, and cyclic amide-ester compound. When the eluting material was observed, the structure of the eluting material was specified with a gas chromatograph mass spectrograph. The detection limit of the gas chromatograph (flame ionization detector) for the methanol solution of dibutyl phthalate was 50 ppb which was equivalent to 0.5 ppb in terms of the concentration of each of the cyclic amide compound, the cyclic ester compound and the cyclic amide-ester compound in the extracted water in the elution test.

Retorting Test

A bag was made from the composite film produced in the manner mentioned above and was packed with the mixture of vinegar, ketchup, and a salad oil with 1:1:1 weight ratio. After the bag was sterilized by heated water at 120° C. for 30 minutes under the pressure of $19.6 \times 10^4$ Pa, the state of peeling between the nylon film and the aluminum foil was observed. Then, the contents were taken out and the peel strength between the aluminum foil and the unextended polypropylene film was measured. The peel strength was measured before and after the sterilization of the retort.

Also, the adhesive composition of the present invention can provide good oil resistance. Accordingly, the adhesive composition of the present invention can be suitably used as the adhesive for use in producing the composite films for packing an oily food product, such as a retort food, requiring the heat sterilization treatment.

Hence, the flexible packaging composite film of the present invention adhesively bonded by the adhesive composition of the present invention can be effectively used as the flexible packaging composite film that can prevent spoilage of the inherent properties or performances of the packed contents, can minimize significant reduction of the strength after heat-sterilized, and can minimize reduction of the peeling strength.

TABLE 1

| Examples & Comparative Examples | Polyol component | | | | | | | | | Silane coupling agent | Polyisocyanate component A |
|---|---|---|---|---|---|---|---|---|---|---|---|
| | A | B | C | D | E | F | G | H | I | | |
| Example 1 | 100 | | | | | | | | | 1 | 10 |
| Example 2 | | 100 | | | | | | | | 1 | 10 |
| Example 3 | | 100 | | | | | | | | | 10 |
| Example 4 | | | 100 | | | | | | | 1 | 10 |
| Example 5 | | | | | 100 | | | | | 1 | 10 |
| Example 6 | | | | | 100 | | | | | | 10 |
| Example 7 | | | | | | 100 | | | | 1 | 10 |
| Example 8 | | | | | | | 100 | | | 1 | 10 |
| Example 9 | | | | | | | | 100 | | 1 | 10 |
| Comparative Example 1 | | | | 100 | | | | | | | 10 |
| Comparative Example 2 | | | | | | | | 100 | | | 10 |

TABLE 2

| Examples & Comparative Examples | Presence of cyclic compound | Nylon film/aluminum foil State of peeling | Aluminum foil/unextended polypropylene film | |
|---|---|---|---|---|
| | | | Peel strength before retort sterilization (N/15 mm) | Peel strength after retort sterilization (N/15 mm) |
| Example 1 | Nil | Non-peeling | 8.5 | 10.0 |
| Example 2 | Nil | Non-peeling | 7.5 | 9.0 |
| Example 3 | Nil | Partial peeling | 7.0 | 8.0 |
| Example 4 | Nil | Non-peeling | 4.0 | 7.0 |
| Example 5 | Nil | Non-peeling | 6.5 | 9.0 |
| Example 6 | Nil | Partial peeling | 6.0 | 7.5 |
| Example 7 | Nil | Non-peeling | 4.0 | 6.0 |
| Example 8 | Nil | Non-peeling | 6.5 | 8.0 |
| Example 9 | Nil | Non-peeling | 7.0 | 8.5 |
| Comparative Example 1 | Nil | Partial peeling | 7.5 | 2.5 |
| Comparative Example 2 | Nil | Partial peeling | 6.0 | 1.0 |

While the illustrative examples of the present invention are provided in the description above, such is for illustrative purpose only and it is not to be construed restrictively. Modification and variation of the present invention that will be obvious to those skilled in the art is to be covered in the following claims.

INDUSTRIAL APPLICABILITY

The adhesive composition of the present invention can provide the result that when a food product or beverage is packed in the composite film, its inherent odor and taste can be prevented from being spoiled. Also, when an electronic component, such as a hard disc, which is subjected to loss by contaminating with even an extremely small amount of foreign objects, is packed in the film, the inherent performances of the electronic component can be prevented from being spoiled. Accordingly, the adhesive composition of the present invention can be suitably used as the adhesive for use in producing the flexible packaging composite films used for a variety of industrial products including those products.

What is claimed is:

1. An adhesive composition comprising a polyisocyanate component and a polyol component,
   wherein the polyol component includes polyester polyamide polyol and/or polyurethane polyester polyamide polyol,
   the polyester polyamide polyol comprises a polyester unit formed by reaction between polybasic acid and/or alkylester thereof and polyol, and a polyamide unit which comprises an amide bond formed by reaction between dimer acid and polyamine as an essential component; wherein said polyamide unit is formed by reaction between polybasic acid and polyamine,
   the polyurethane polyester polyamide polyol is formed by reaction between the polyester polyamide polyol and polyisocyanate, and
   wherein an elution test using gas chromatograph-flame ionization shows the concentration of a cyclic compound, formed during the formation of said polyester unit and said polyamide unit, is 0.5 ppb or less based on a dibutyl phthalate standard in a solution eluted from 0.5 mL/cm$^2$ per unit area of a composite film containing the adhesive composition.

2. The adhesive composition according to claim 1, wherein the polybasic acid of the polyester unit is an aromatic dibasic acid and/or the dimer acid.

3. The adhesive composition according to claim 1, wherein 10-90 mol % of a carboxyl group of the dimer acid forming the amide bond reacts with an amino group of the polyamine.

4. The adhesive composition according to claim 1, which further comprises a silane coupling agent.

5. The adhesive composition according to claim 1, wherein the polybasic acid of the polyester unit is at least one kind selected from the group consisting of phthalic acid, naphthalenedicarboxylic acid and dimer acid.

6. The adhesive composition according to claim 1, wherein the polyester unit comprises an ester bond formed by reaction between phthalic acid and/or alkyl ester thereof and glycol comprising no ether linkage in a principal chain and having 6-7 carbons in the principal chain an ester bond formed by reaction between naphthalene dicarboxylic acid and/or alkyl ester thereof and glycol, and an ester bond formed by reaction between dimer acid and glycol as principal ester bonds.

7. The adhesive composition according to claim 1, wherein the polyamide unit comprises an amide bond formed by reaction between dimer acid and aliphatic diamine and/or an amide bond formed by reaction between dimer acid and alicyclic diamine as a principal amide bond.

8. A flexible packaging composite film adhesively bonded by adhesive composition comprising a polyisocyanate component and a polyol component, wherein the polyol component includes polyester polyamide polyol and/or polyurethane polyester polyamide polyol the polyester polyamide polyol comprises a polyester unit formed by reaction between polybasic acid and/or alkylester thereof and polyol and a polyamide unit which comprises an amide bond formed by reaction between dimer acid and polyamine as an essential component, wherein said polyamide unit is formed by reaction between polybasic acid and polyamine, the polyurethane polyester polyamide polyol is formed by reaction between the polyester polyamide polyol and polyisocyanate, and wherein an elution test using gas chromatograph-flame ionization shows the concentration of a cyclic compound, formed during the formation of said polyester unit and said polyamide unit, is 0.5 ppb or less based on a dibutyl phthalate standard in a solution eluted from 0.5 mL/cm$^2$ per unit area of a composite film containing the adhesive composition.

* * * * *